United States Patent [19]

Lindberg

[11] Patent Number: 4,516,553
[45] Date of Patent: May 14, 1985

[54] COMBUSTION AND POLLUTION CONTROL SYSTEM

[75] Inventor: John E. Lindberg, Lafayette, Calif.

[73] Assignee: Owen, Wickersham & Erickson, San Francisco, Calif.

[21] Appl. No.: 513,901

[22] Filed: Jul. 14, 1983

Related U.S. Application Data

[60] Division of Ser. No. 190,932, Sep. 25, 1980, Pat. No. 4,331,525, which is a division of Ser. No. 657,747, Feb. 13, 1976, abandoned, which is a continuation-in-part of Ser. No. 613,867, Sep. 16, 1975, abandoned, which is a continuation-in-part of Ser. No. 356,589, May 3, 1973, abandoned, which is a continuation-in-part of Ser. No. 227,440, Feb. 18, 1972, abandoned.

[51] Int. Cl.³ .............................................. F02B 47/08
[52] U.S. Cl. .................................... 123/568; 123/573; 137/114
[58] Field of Search .................. 123/25 E, 25 F, 25 L, 123/25 P, 25 R, 572, 573, 574, 568; 137/109, 111, 114, 625.6, 625.68, DIG. 8

[56] References Cited

U.S. PATENT DOCUMENTS

| | | | |
|---|---|---|---|
| 1,981,891 | 11/1934 | Woermann | 123/25 E |
| 3,099,282 | 7/1963 | Miller et al. | 137/111 |
| 3,545,479 | 12/1970 | Loe | 137/625.68 |
| 4,458,712 | 7/1984 | Stevenson | 137/114 |

Primary Examiner—Parshotam S. Lall
Assistant Examiner—W. R. Wolfe
Attorney, Agent, or Firm—Owen, Wickersham & Erickson

[57] ABSTRACT

An inverter apparatus for producing an increasing vacuum effect in response to a decreasing vacuum field. A piston is axially movable within a cylindrical bore. The piston has a first surface exposed to atmospheric pressure. A spring biases the piston in a direction opposed to the direction of movement which would be produced by atmospheric pressure on the second surface. A fluid inlet passageway extends through the cylinder and opens into the cylindrical bore, the piston having an axially extending side wall facing the cylindrical bore. An orifice formed in that side wall and an outlet passageway located at one end of the orifice connect that end with the chamber having the vacuum acting on the first surface of the piston. The axially extending orifice is so located in the side wall of the piston as to provide a decreasing restriction to flow of fluid from the first passageway through the orifice to the outlet with decreasing vacuum.

8 Claims, 10 Drawing Figures

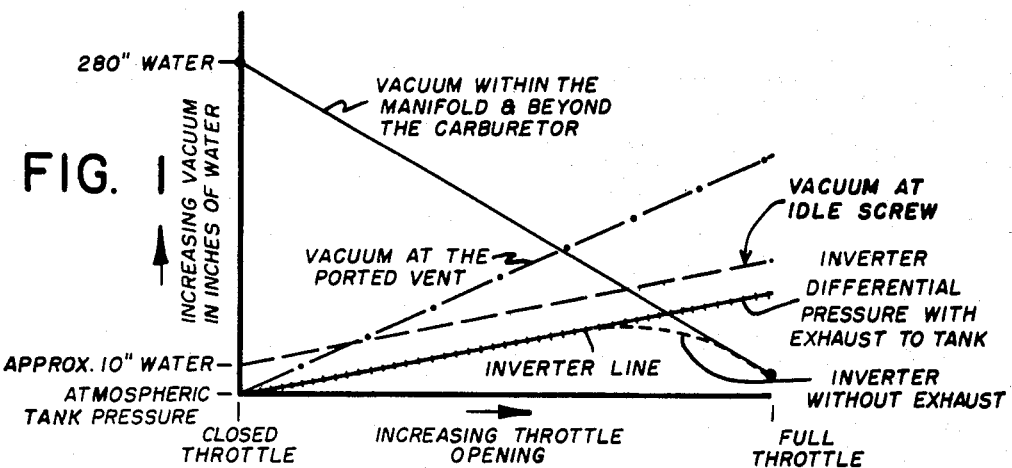
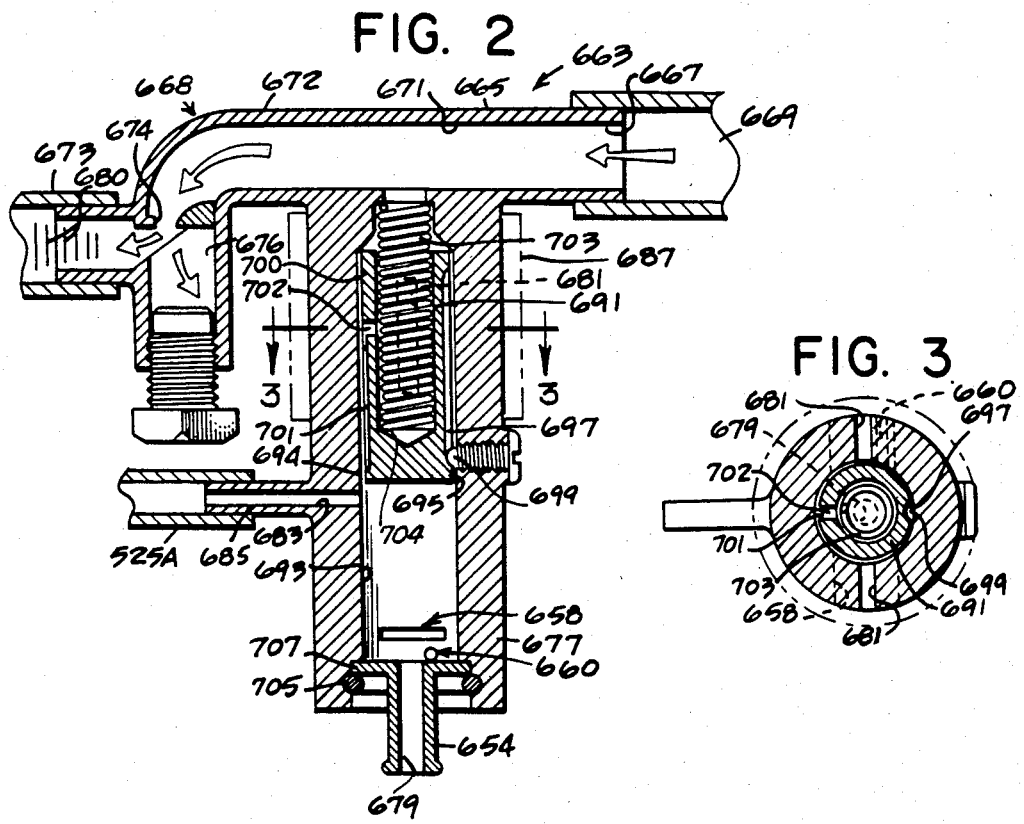

COMBUSTION AND POLLUTION CONTROL SYSTEM

This application is a division of application Ser. No. 190,932, filed Sept. 25, 1980, now U.S. Pat. No. 4,331,525, which was a division of application Ser. No. 657,747, filed Feb. 13, 1976, now abandoned, which was a continuation-in-part of application Ser. No. 613,867 filed Sept. 16, 1975, now abandoned, which was a continuation-in-part of application Ser. No. 356,589 filed May 3, 1973, now abandoned, which in turn was a continuation-in-part of application Ser. No. 227,440 filed Feb. 18, 1972, now abandoned.

BACKGROUND OF THE INVENTION

The problem of pollution from automobiles is now very well recognized, and national, state and local laws have been passed requiring corrections. Attempts at solving the problem of pollution by cars have steadily been accompanied by decreasing the performance of the vehicle, making it harder to start and hard to stop when ignition is turned off due to auto-ignition, more critical to keep in adjustment and less drivable, less powerful, and less economical.

It has previously been proposed to inject water and steam into the induction systems of reciprocating piston internal combustion engines.

The prior art proposals for the injection of water or steam can be dividable primarily into two areas. The water or steam was injected either directly into the vacuum in the inlet manifold or was injected as a part of the throttle linkage speed control. In either case the prior art fluid injection systems did not produce the injection of sufficient amounts of fluid over the full engine operating range and/or gave excessive amounts under some conditions and did not supply fluid as needed.

In the vacuum control system the fluid was not injected in correct amounts at idle (normally being too much) and at full load was quite insufficient.

In both the former vacuum control and the throttle linkage control systems little or no fluid was injected during acceleration at full throttle under full load from low speed. This is precisely the time when the maximum amount of fluid injection is needed.

SUMMARY OF THE INVENTION

The present invention solves these problems by use of injection of properly controlled amounts, relating to operating mode, of a fluid (water or steam plus at times hot exhaust gas, air, hydrogen and additives such as hydrogen peroxide, methyl alcohol or ammonia) into, preferably, an inlet point that increases its vacuum with increasing engine power, such as the idle screw and/or the ported vent of the carburetor or it can be injected by an inverter into the PCV port or by separate adapter plate below the carburetor and thereby into the combustion chamber. This keeps the PCV system, ports, and combustion chambers clean and provides a cylinder charge of increased heat capacity and higher specific heat per cycle to increase internal cooling of hot spots within the combustion chamber cycle, to lower peak temperature, to prevent detonation, hot spot pre-ignition, and nitrous oxide (NOx) formation (formed above approximately 3400° F.) and to use the vapor energy of steam expansion to increase the torque, acceleration and efficiency.

The prior art proposals injected water or steam into a decreasing vacuum field (max vacuum at idle and min at full throttle). This is diametrically opposite to the desired condition which is to inject into a field where the vacuum increases from zero at idle to max at full throttle.

The use of a decreasing vacuum field to produce an increasing vacuum input effect for the fluid is shown in the inverter system. The inverter provides the ideal zero vacuum at idle (so no fluidic drain column is required).

The vacuum continues to smoothly increase until full throttle is approached, where it drops off rapidly. This is corrected by applying above the water exhaust manifold total pressure either directly or through a low inertia fluidic valve to half wave rectify the alternating exhaust pressure and also applying this exhaust pressure to the inverter. This provides an increasing exhaust pressure (super atmospheric) over the water to correct for the vacuum decrease at full throttle noted above. The result is a steady increase in differential pressure of atmospheric total pressure over the tank water minus the total pressure at the fluid inlet point via the inverter which starts at zero at idle and which steadily increases with increasing power to max at full throttle. The inverter follows the power demand, giving zero flow at idle and steadily increasing fluid flow with increased power up to full throttle. On deceleration the fluid flow is fully cut off and any excess fluid is drained. On acceleration exhaust pressure over the top of tank fluid provides the extra fluid needed during acceleration. At engine off all fluid flow to the engine is instantly cut off, and drainage for any possible fluid in the engine fluid line is also provided. Air lean-out at engine cut-off is provided to aid in preventing dieseling (after-fire).

The inverter also provides air bleed lean-out proportioned to power to provide the additional air lean-out the engine is capable of using when operating with the described invention to give best economy and minimum emissions.

Other objects, advantages and features of my invention will become apparent from the following detailed description of one preferred embodiment taken with the accompanying drawings.

BRIEF DESCRIPTION OF THE DRAWINGS

In the drawings:

FIG. 1 is a diagram showing the manner in which the vacuums within the engine manifold, at the ported vent, at the idle screw and at the inverter (FIGS. 2-8) respectively vary with changing throttle openings.

FIG. 2 is a side elevation view in cross section of an inverter apparatus for converting a vacuum existing below the butterfly in the carburetor from a vacuum that decreases with increasing engine power to a vacuum which increases with increasing engine power. FIG. 2 shows the inverter apparatus with the parts in the relative positions assumed at idle condition of operation of the engine. FIG. 2 also shows an ultrasonic device for generating ultrasonic waves to aid in mixing the fuel, air and steam using the flow energy of the PCV system and the added steam and air provided through the inverter apparatus.

FIG. 3 is a cross section view taken along the line and in the direction indicated by the arrows 3—3 in FIG. 2.

DESCRIPTION OF THE INVENTION

The vacuum in the inlet manifold of the engine at idle is a maximum and progressively decreases with increasing throttle opening as illustrated by the solid line in FIG. 1.

The present invention takes advantage of this relationship of the vacuum within the inlet manifold to produce an inverted relationship between the vacuum at the outlet end of the fluid injection apparatus so that the vacuum at the outlet end of the fluid injection apparatus goes from zero at closed throttle to a maximum at full throttle as shown by the line labeled "Inverter Line" in FIG. 1.

The term "vacuum" as used herein has been used to refer to the difference in pressure between the pressure existing at the outlet end of the steam injection apparatus and the pressure normally existing (ambient atmospheric pressure) over the fluid in a storage tank 503 (see FIG. 7) equipped with a fluidic check valve 504. As will be described in more detail below, the pressure over the fluid in the storage tank 503 may be increased above normal atmosphere, as by introducing engine exhaust pressure, and in this event the term "vacuum" will be used to indicate the difference between the pressure existing at the outlet end of the fluid injection apparatus and the super atmospheric pressure existing over the fluid in the storage tank.

The embodiments of the present invention which will now be described use a decreasing vacuum field to produce an increasing vacuum effect. One embodiment of an inverter apparatus for obtaining this result is shown in FIGS. 2–6.

Figure 8:
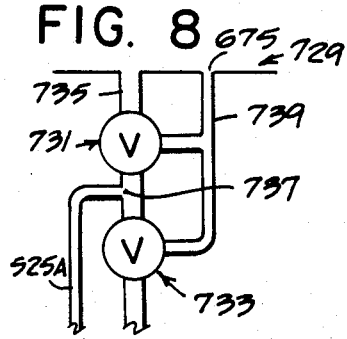
FIG. 8 is an elevation view of another embodiment of an emission control system constructed in accordance with the present invention and incorporating a dual valve arrangement for using a decreasing vacuum field to produce an increasing vacuum effect.

Another embodiment of the present invention for obtaining this result is shown in FIG. 8.

Thus, in accordance with the present invention, the engine vacuum existing below the butterfly of the carburetor, such as in the intake manifold, can also be used to control the amount of fluid (steam or water) inducted into the engine induction system even though the vacuum within the manifold and beyond the carburetor varies in a manner directly opposite the generally desired relationship of increasing vacuum with increasing throttle opening as described above.

The way that this is accomplished in the FIGS. 2–6 embodiment of the present invention is by the use of an inverter apparatus 663 which converts the vacuum within the manifold and beyond the carburetor to a vacuum which does increase, substantially linearly, with increasing throttle opening.

One embodiment of an inverter apparatus for performing this function of the present invention is illustrated in FIG. 2 and is indicated generally by the reference numeral 663.

The inverter apparatus 663 comprises a T-shaped member 665 having one opening 667 adapted for connection to an outlet hose 669 of the PCV valve 670 (see FIG. 7) and having another opening 671 adapted for connection directly (or through an ultrasonic generator 668 as illustrated in FIG. 2) to a hose 673. The hose 673 connects to an opening 675 (see FIG. 7) located beyond the carburetor butterfly valve 666.

The inverter apparatus 663 has a downwardly extending cylinder 677 which provides a cylindrical bore 693 for a piston 691.

The lower end of the cylinder 677 has a washer 707 held in position by a snapring 705. The washer has an opening 679 and a hose nipple extension 654 to connect to an exhaust line 656.

An exhaust vent 658 is located in the sidewall of the lower part of the bore 693 for regulating the position of the piston 691 at full throttle (FIG. 6) to maintain a passageway 702 of the piston in communication with a passageway 683 in this full throttle condition of operation, as will be described in more detail below, and to prevent the piston from dropping to the position illustrated in FIG. 4 (engine off). The exhaust pressure acts on the underside of the piston 691 in the full throttle condition of operation (because the piston 691 partially restricts flow of the exhaust pressure from the vent line 656 through the bent 658 to atmosphere) and thus prevents the side wall 700 of the upper end of the piston 691 from blocking the flow of steam from the passageway 683 to the engine at full throttle.

The downwardly extending cylinder 677 also has two vertically elongated ports 681 formed in the upper side walls of the stem and a bleed port 660 at the lower end of the bore 693.

The port 683 formed in a side wall of the cylinder 677 connects to a stem 685 which is in turn connected to the conduit 525A which conducts the steam from the outlet of a reactor 550.

A filter 687, formed of plastic or rubber foam or any other suitable water porous filter material, is disposed on the outside of the cylinder 677 for filtering air before the air is permitted to go into the ports 681.

The piston 691 is mounted for axial movement within the inner bore 693. The piston 691 has a lower flange 695 which engages the inner surface of the bore 693 in a sliding fit, and the upper portion of the piston 691 has a guide slot 697 which coacts with a radially inwardly protecting guide member 699 extending into the interior of the cylinder 677.

The side of the piston opposite to that having the guide slot 697 is formed with a flow passageway slot 701 for permitting flow of fluid from the conduit 525A through the flow passageway 701 and to the outlet opening 671 when the piston flange 695 is disposed below the port 683.

A spring 703 seats on an internal base 704 within the hollow interior of the piston 691 and biases the piston downwardly within the bore 693.

In operation of the inverter apparatus 663, at idle conditions (FIG. 2) the vacuum in the T-section 667 and 671 is maximum (see the solid line in FIG. 1) and large enough to overcome the gravitational force and spring 703 force against the piston to bring it up to the point shown in FIG. 2. In the position shown, the port 683 is open and therefore any fluid or residual steam in line 525A is vented to the atmosphere through the exhaust vent 658.

As the manifold vacuum decreases with the throttle opening and power increase, the PCV valve 670 unseats and opens, causing the pressure in line 669 to decrease even more than the vacuum in the manifold below the carburetor. This reduced vacuum at part throttle (FIG. 5) allows the force of the spring 703 to force the piston 691 downward beyond the port 683 so that flange 695 passes beyond the port 683 and the vacuum of the line 669 from the PCV valve appears through the orifice of the restriction 701. The vacuum at 525A is a vacuum determined by the ratio of the vacuum within the PCV line 669 as metered by orifice 701 versus the atmospheric pressure at port 658 as metered by the spaced clearance 694 between the flange 695 and the inner bore 693 of the cylinder.

As the throttle and power are further increased to full throttle (FIG. 6), the manifold vacuum and the PCV vacuum as appearing in 669 decrease, causing the piston 691 to further move downward.

This results in a change in the ratio of the orifice 701 above the port 683 on the one hand and the orifice of 701 plus the clearance restriction 694 between the flange 695 and the inner bore 693 of the cylinder added together on the other hand. In the condition of operation illustrated in FIG. 6, the vacuum in 683 is equal to the full vacuum in 669.

In going from part throttle (FIG. 5) to full throttle (FIG. 6), the vacuum of the shorter section 701 above the port 683 continues to increase as its restriction decreases, and the net result is an increase in vacuum as the piston 691 drops farther down the bore, which lowering of the piston accompanies the decreasing vacuum within the PCV line 669.

The important thing to note at this point is that the passageway 701 acts as a restrictor and the amount of the restriction that it provides is dependent upon the relative vertical position of the piston 691 with respect to the passageway 693. As the piston 691 moves farther downward in the cylinder, the length of the passageway 701 decreases and the restriction that this passageway provides also decreases.

The pressure which is effectively applied to the passageway 683 is therefore dependent upon the ratio of the orifices which are provided by (a) the effective length of the passageway 701 above the passageway 683 to (b) the restrictive provided by the effective length of the passageway 701 below the opening 683 and the restriction provided by the clearance 700 between the flange 695 and the inner surface of the cylindrical bore 693. Thus, as the piston 691 moves farther down within the bore 693, the restriction provided between the flange 695 and the side wall of the bore 693 remains essentially constant but the restriction provided by the passageway 701 below the opening 683 increases because a greater length of this passageway 701 is disposed below the opening 683.

Also, as the piston 691 is lowered, it uncovers ports 681 to allow air to enter through these ports, through the filter 687, to provide leaning out of the engine as desired for optimum engine performance at its optimum lean fuel/air ratio for best economy and minimum emissions. These ports are shaped for optimum fuel/air ratio change and may be larger at the bottom than at the top so that as the piston moves downward with increasing engine power, there is an increasing amount of air available for lean-out for maximizing economy and for lowering emissions.

The position of the piston 691 is dependent upon two factors. The spring force exerted by spring 703 on the top of the piston varies with the vertical position of the piston 691 within the cylinder because of the changing extension or compression of the spring. The differential between the pressures acting on the top side of the piston 691 and the pressure acting on the bottom side of the piston 691 also serves to provide a force which effects the position of the piston 691 within the cylinder. That is, at engine idle (FIG. 2) and part throttle (FIG. 5) the bottom face of the piston 691 is effectively exposed to atmospheric pressure, when the flange 695 passes below the opening 683, because atmospheric pressure is transmitted to the interior of the lower part of the bore 693 through the opening 658. The upper surface of the piston 691 is subjected to a vacuum pressure which is dependent primarily on the PCV line pressure but which is affected to some extent by the atmospheric pressure admitted through the ports 681 (when the top edge of the piston 691 partially opens these ports at part throttle), and by the partial pressure exerted on the top surface of the piston 691 by the incoming fluid flowing through the opening 683 and to the outlet conduit 671.

At full throttle (FIG. 6) the lower surface of the piston 691 is subjected to a super atmospheric pressure (caused by the engine exhaust pressure transmitted through the line 656) as regulated by the spring force 681 and the related open area of the vent 658. By using the engine exhaust pressure to pressurize the storage tank 503 (FIG. 7) to a super atmospheric pressure and then transmitting the higher pressure through the conduit 656 to the lower end of the bore 693, the differential pressure across the piston 691 is substantially increased at full throttle (as compared to the differential without the pressure of the exhaust gas). This is graphically illustrated in FIG. 1 (see the legends at the right hand end of the Inverter Line). The increased differential at full throttle provides the important benefit of insuring that the feed of steam to the engine is maintained, and not blocked off by the part 700 of the piston, at full throttle.

On engine shut down, the engine exhaust pressure goes to zero, and the residual exhaust in the lower end of the bore 693 is bled to atmosphere through the bleed port 660 so that the piston can move to the bottom of the bore 693. This downward movement of the piston 691 positions land 700 to block off passageway 683 and also opens ports 681 to a maximum so that the engine shuts off clean.

The line 652 preferably has a fluidic check valve 659 so that the engine exhaust pressure can be rectified to maximize the effect of this pressure and can be introduced into the tank 503 beneath the surface of the liquid to maximize cleaning of the exhaust gas before transmitting the pressure to the inverter 663.

The effect of the inverter apparatus construction and mode of operation shown in FIG. 2 and described above is to convert the relationship of vacuum within the manifold and beyond the carburetor (the relationship shown in the solid line in FIG. 1) from a relationship in which the vacuum is a maximum at closed throttle and is a minimum at full throttle to a relationship in which the vacuum at closed throttle is zero and varies, as shown by the Inverter Line in FIG. 1, in an increasing manner to a maximum at full throttle. This converted vacuum condition at the passageway 683 of the inverter apparatus 663 is therefore exactly the type of vacuum relationship which is desired for changing engine throttle opening conditions.

The inverter apparatus shown in FIG. 2 also has a further advantage in that the vacuum at closed throttle, which can be at idle or deceleration (FIG. 2), or at engine off (FIG. 4), is in fact zero so that all fluid coming from the line 525A is positively drained to atmosphere through the outlet openings 658 and 660 on a closed throttle condition (engine operating) or blocked by the land 700 (engine off). This insures that no fluid from the steam line 525A can go to the engine on closed throttle, whether or not auxiliary fluidic drain valves or other drain apparatus are used with the system. In fact, this construction shown in FIG. 2 makes it unnecessary to use any auxiliary drain devices. Furthermore, by locating the inverter essentially right at the point of intake to the engine induction system, the desired shut-off and drain of steam is insured without the opportunity for any overrun. The draining operation of the FIG. 2 apparatus is essentially instantaneous. When the throttle is closed, any excess fluid in the line 525A is drained instantly and the access to the engine is cut off by the flange 695.

The manner in which the flange 695 of the piston rides up above the port 683 on closed throttle (engine operating) not only permits drain of the fluid from the port 683 to drain outlets 658 and 660, but the flange 695 also serves to block any possible flow of fluid from the orifice 683 up into the outlet passageway 671. In this respect, the piston 691 acts as a valve.

It should be noted also that the relationship of the length of the piston 691 to the length of the inner bore 693, the shape of the land 700 and the positioning of the slots 681 insure that no fluid can go to the engine on engine off.

On engine shut-down, the vacuum drops off to zero and the spring 703 forces the piston 691 downwardly until the flange 695 seats on the plate 707 supported on the snap-ring 705 at the lower end of the inner bore 693. When the flange 695 engages the plate 707, the upper land 700 of the piston 691 is disposed opposite the port 683 to block flow from the port. Any leakage past the land 700 flows out the slots 681 and through the air filter 687 surrounding these slots.

That is, when the engine is shut off, the vacuum in the PCV line 669 goes to zero and the spring 703 forces the piston 691 downwardly until the flange 695 engages the washer 707. At that point the land 700 of the side wall of the piston above the opening 702 blocks flow through the opening 683. This effectively prevents any flow of fluid from the line 525A to the engine. If there should be any leakage of fluid past this side wall portion 700 of the piston, whatever leakage might occur must flow out of the ports 681 before such leakage could get to the outlet 671 and to the engine.

The ports 681 thus provide two functions. The ports provide positive protection against leakage flow into the engine on engine shutdown. However, the primary purpose of the ports 681 is to provide additional lean out on certain operating conditions. Because the piston 691 moves downwardly with increasing engine power, the cross sectional area of each port 681 that is opened increases proportionally to provide additional and increasing lean out of the engine with increasing engine power.

The relationship of the piston 691 to the location and configuration of the ports 681 is normally provided so that there is no engine lean out at idle. That is, at idle conditions of operation the piston 691 blocks any flow from the ports 681 into the conduit 673. However, if some lean out flow is desired at idle, the relative proportions and positions of the piston 691 and the ports 681 can be constructed to accomplish the desired lean out.

As illustrated in FIG. 2, an ultrasonic generator 668 can be used with the inverter apparatus 663. The inlet end 672 of the ultrasonic generator 668 is connected to or can be made (as illustrated in FIG. 2) integral with the outlet 671 of the inverter.

The fluid flow going into the inlet end 672 of the ultrasonic generator (the combined PCV valve crank case gases, the steam from the conduit 525A and any additional lean out air induced through the openings 679 and 681) flow through an orifice 674. The fluid flowing through the orifice 674 flows partly into a resonating chamber 676, and the main body of the flow goes into the outlet 673 of the ultrasonic generator 670. The effect of the resonating chamber 676 is to produce standing waves 680 in the outlet conduit 673 at ultrasonic frequencies, and this ultrasonic generator provides a highly efficient mixing of all materials in the flow stream and also provides shock waves for enhancing the mixing of the material in the conduit 673 with air/fuel mixture flowing out of the lower end of the carburetor. The ultrasonic generator 668 therefore uses the flow energy of the flow stream for improving the vaporization and mixing of the flow out of the inverter apparatus 663 with the flow out of the carburetor.

It should be noted also that the PCV valve line 669 is in all cases connected to the engine induction system beyond the butterfly valve 666 so that the vacuum in this line 669 does vary, as illustrated by the solid outline in FIG. 1, from a maximum at closed throttle to the minimum at full throttle.

Figure 5:
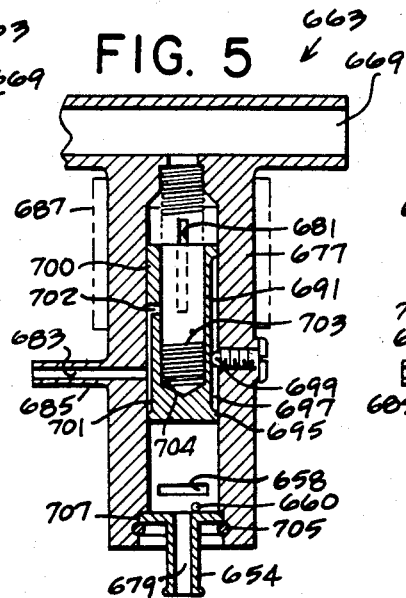
FIG. 5 is a view like FIG. 2 but showing the operative parts in the relative position assumed at part throttle operation of the engine.
Figure 6:
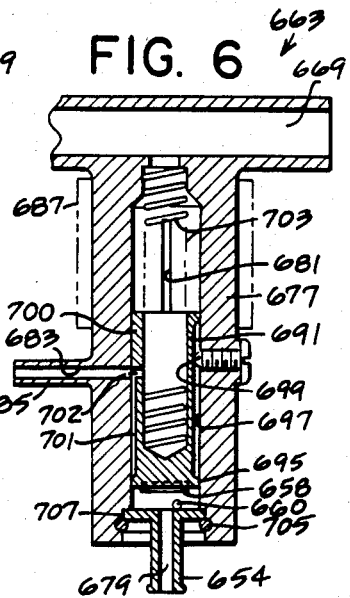
FIG. 6 is a view like FIG. 2 but showing the operative parts in the relative positions assumed at full throttle operation of the engine.
Figure 7:
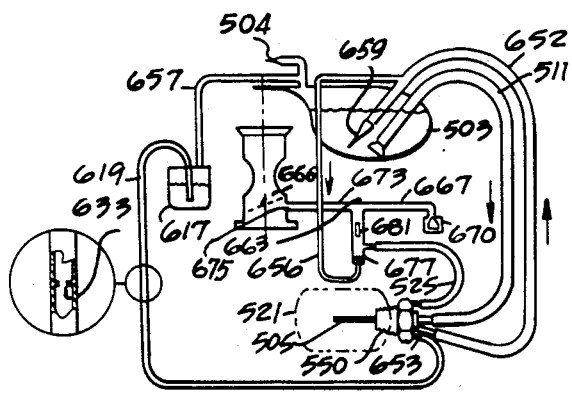
FIG. 7 is an elevation view of another embodiment of an emission control system constructed in accordance with the present invention and incorporating the inverter apparatus of FIG. 112 and a reactor apparatus.

FIG. 7 is an elevation view of an embodiment of an emission control system incorporating the inverter apparatus of FIGS. 2-6 and also incorporating the reactor apparatus 550.

Parts in the FIG. 7 apparatus which correspond with parts shown in other views of the drawings have been indicated by corresponding reference numerals.

Thus, the FIG. 7 embodiment includes a water storage tank 503 with a fluidic check valve 504, a conduit 511 for conducting water from the tank 503 to the reactor 550, a fuel supply tank 617, a conduit 619 (with a flow regulating restrictor 633) for conducting fuel from the fuel supply tank 617 to the reactor 550, a conduit 525A for conducting the steam and precombustion reaction products from the reactor 550 to the inverter 663, a PCV valve 670, a conduit 667 for conducting flow from the PCV (positive crank case ventillation) valve 670 to a T-connection at the outlet of the inverter 663, a PCV line 669 (to which the outlet of the inverter 663 is connected), and a line 673 which connects the junction of the PCV line 667 and the outlet of the inverter 663 to the engine induction system at a location 675 beyond the butterfly 666 of the carburetor. The location 675 is that normally used for inducting the flow by gases of the PCV valve into the engine induction system. The present invention, however, is not limited to this particular point of connection to the carburetor. The proper functioning of the inverter 663 in the system of the present invention is dependent only on making the connection to the engine induction system at a point where the vacuum decreases with increasing throttle settings.

The FIG. 7 embodiment also includes conduits 652 for transmitting exhaust gas pressure to the storage tank 503, a fluidic check valve 654 for rectifying the alternating pressure of the exhaust gas, and conduits 656, 657 for transmitting the superatmospheric pressure from the storage tank 503 to the inverter 663 and to the fuel tank 617.

In the operation of the FIG. 117 embodiment, the feed water is fed from the tank 503 to the reactor 550 by both gravity and vacuum. In this particular embodiment the effect of the vacuum of the feed of water is considerably greater than the effect of gravity; and as a result, the water supply tank 503 can be located below the level of the reactor 550, if so desired.

Fuel from the tank 617 is fed through the conduit 619 and past the flow regulating restrictor 633 to the reactor 550. As illustrated in FIG. 7, the fuel conduit 619 is connected to the reactor 550 at the inlet connection 653. When the fuel conduit 619 is connected to the inlet 653 of the reactor 550, the fuel is mixed with the water downstream of a variable orifice flow control valve in the reactor 505.

Figure 4:
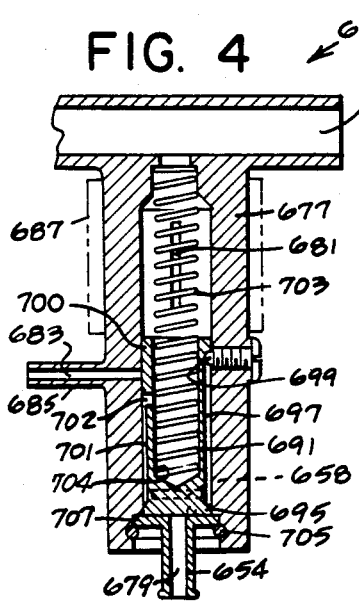
FIG. 4 is a view like FIG. 2 but showing the parts in the operative position assumed when the engine is off and is not running.

It should also be noted that the FIG. 4 embodiment can use a fixed orifice in place of a variable orifices in the reactor 550.

The fact that the inverter 663 of the FIG. 4 embodiment provides the capability of shutting off any flow to the engine entirely on both engine shut off and on deceleration (a) makes it possible to connect the fuel line downstream of the flow control orifice and (b) makes it possible to use a fixed orifice in place of a variable orifice. That is, since the inverter has a piston 691 which is positionable (as described in detail above with reference to FIGS. 2-6), to insure against any flow of fluid frm the inlet 683 to the outlet 671 on both engine shut off and on engine deceleration, and at idle, it is not necessary to provide or to rely on a flow shut off valve (such as a variable orifice flow control valve) upstream of the inverter apparatus 663.

A fixed orifice 633 for control of the fuel flow (allowing entrance at 653) and another fixed orifice (in place of a variable orifice) can be used because the inverter 663 is capable of providing an increasing vacuum with increasing engine power to match the engine need. By proper choice of orifice sizes the desired rate of flow of the water and of the fuel to the reactor is controlled without having to have variable orifice valves in the feed lines. The variable vacuum with fixed orifices provide the variable flow desired.

A flash boiler 505 in a hot exhaust manifold 521 shown in FIG. 7, is illustrated as part of the reactor 550. It should be noted, however, that the flash boiler 505 is not limited to the coaxial construction shown in FIG. 7 but can instead, in the FIG. 7 embodiment, be formed of tubing, and the flash boiler can also be metal tubing such as aluminum wound around the exhaust manifold 521 or the header. The particular form of the flash boiler is not critical to the construction or mode of operation of the FIG. 7 embodiment.

In summary on the FIG. 7 embodiment it really is not necessary to have anything more than a fixed orifice for controlling the water flow to be converted to steam.

If precombustion reaction products are desired, the fuel conduit 619 can additionally be connected in association with the water feed line 511 and the fuel flow is mixed with the water in a flash boiler 505 which serves as a reactor for not only converting the water to steam but also for converting the fuel and steam into precombustion reaction products.

The particular form of the flash boiler-reactor is not critical. If fuel is added to the water to provide precombustion reaction products, adequate temperatures are required in the flash boiler to produce the reaction. That is, temperatures of 900° F. or above are preferable to provide the complete reaction desired.

The outlet of the reactor 550, the fitting 525, is connected to the conduit 525A. This conduit 525A thus conducts the steam and precombustion reaction products to the inlet 683 of the inverter apparatus 663, and the flow of the steam and precombustion reaction products is then regulated by the structure of the inverter apparatus 663 under various engine operating conditions, such as operation at idle, operation at part throttle, operation at full throttle, deceleration and engine shut off as described more fully and in detail above with reference to FIGS. 2-6.

Another embodiment of an inverter apparatus for using a decreasing vacuum field to produce an increasing vacuum effect is illustrated in FIG. 8 and is indicated generally by the reference numeral 729.

The inverter apparatus 729 comprises a first valve 731 and a second valve 733. Both valves 731 and 733 are located in a conduit 735 which connects to the manifold 675. The steam inlet line 525A is connected to a location 737 in the line 735 between the valves 731 and 733.

A pressure sensing line 739 extends from the manifold 675 and is connected to each of the valves 731 and 733 to control the opening and closing of the valves in response to changes in vacuum in the manifold.

The valve 731 is constructed to be normally closed at high vacuums as sensed by the line 739 (high vacuums such as exist at engine idle), and the valve 733 is constructed to be normally open at high vacuums as sensed by the line 739.

In operation the valve 731 progressively opens with decrease in the vacuum sensed by the control line 739, and the valve 733 progressively closes with decrease in the vacuum sensed by the control line 739 so that the vacuum produced at the connectin 737 of the steam inlet conduit 525A increases from zero at engine idle to a maximum at full throttle and is thus an inversion of the change in vacuum existing in the manifold 675.

The FIG. 8 construction also provides zero vacuum (atmopsheric pressure) at engine idle since the valve 733 is fully open and valve 731 is fully closed at this idle condition of operation. This construction is preferably used in connection with the exhaust pressurization of the liquid storage tank.

Figure 9:
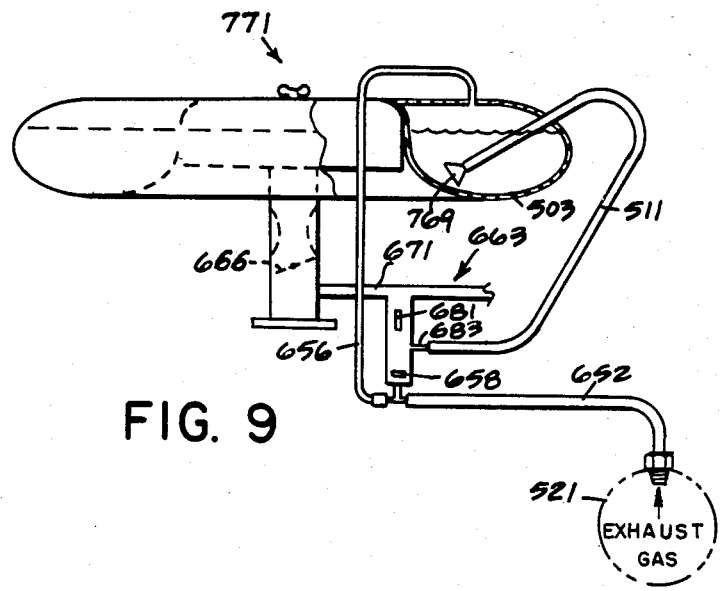
FIG. 9 is a side elevation view of another embodiment of an emission control system constructed in accordance with the present invention. In the FIG. 9 embodiment the fluid injected into the engine is water, or a solution of water plus additives, and the amount of fluid injected into the engine is regulated by an inverter apparatus like that shown in FIGS. 2–7 so that the amount of fluid injected is metered in response to vacuum in the engine induction system, as modified by engine exhaust gas pressure at large throttle openings.

Another embodiment of an emission control system using the inverter 663 is illustrated in FIG. 9 and is indicated generally by the reference numeral 771.

The system 771 supplies the fluid to the engine in the form of a liquid rather than as steam.

The system shown in FIG. 9 controls the flow of fluid to the engine by an inverter apparatus substantially the same as that illustrated in FIGS. 2–7 with the only significant difference being in the sizes of the orifices within the inverter apparatus 663. In the system illustrated in FIG. 9 the sizes of the orifices within the inverter apparatus 663 are smaller than the related orifices of the inverter apparatus 663 used in the FIG. 7 embodiment. In particular, the orifices 701 and 702 (shown in FIG. 2) and the space 694 shown in FIG. 2 have a larger cross section when these orifices are used for controlling steam and precombustion reaction products than the cross sections involved when a liquid is controlled.

The system 771 shown in FIG. 9 comprises several component parts which are the same as component parts in other embodiments described above, and the same reference numerals have been used in FIG. 9 to denote these same parts.

The system 771 shown in FIG. 9 includes a liquid storage tank 503 which stores water or water plus additives such as ammonia and alcohol and other additives as noted above in other parts of this specification.

A conduit 511 has a filter 769 on the inlet end and is connected at its outlet end to a passageway 683 of an inverter apparatus 663.

The inverter apparatus 663 is constructed the same as that illustrated in FIGS. 2–7 so that the passageway 683 leads to the interior of a cylindrical bore 693.

The movable piston 691 then controls the amount of fluid fed from the passageway 683 through the outlet passageway 671 and to the inlet of the engine at a point beyond the carburetor butterfly 677.

The way in which the piston 691 is positioned in response to the vacuum in the inlet manifold (and the exhaust gas pressure in the manifold 521 transmitted to the converter apparatus 663 by the conduit 652) is described in detail above with reference to FIGS. 2–7.

The piston 691 is positioned as illustrated in FIG. 2 at engine idle, is positioned as illustrated in FIG. 4 at engine shut-off, is positioned as illustrated in FIG. 5 at part throttle and is positioned as illustrated in FIG. 6 at full throttle.

The amount of fluid (which in the FIG. 9 embodiment is either water or water plus additives) flowing to the engine is therefore regulated by the position of the piston 693 and related orifices in response to engine need at each engine operating condition.

In the FIG. 9 embodiment the liquid is supplied to the engine at substantially the same temperature as exists is the supply tank 503. This temperature is about 110°–115° F. under normal conditions of operation. However, the fluid is supplied to a vacuum condition as soon as it passes beyond the piston 691, and this promotes rapid vaporization of the liquid.

While the inverter apparatus 663 shown in the FIG. 9 system has been illustrated as associated with the PCV line, this is not necessary; and the inverter apparatus functions quite satisfactorily without any association with the PCV line.

The system shown in FIG. 9 is a very cost effective system which is applicable to all cars, generally with a minimum of modification since all cars of recent manufacture have existing PCV lines. Also, the system shown in FIG. 9 eliminates the need for feeding the liquid in through the idle screw. This is a benefit in some cases because not all cars have idle screw openings which are suitable for some of the embodiments of the present invention.

As in the other embodiments of invention using the inverter apparatus 663, the system 771 shown in FIG. 9 provides for desired lean-out within the inverter apparatus itself by the operation of the ports 681. Also, as in the other embodiments using the inverter apparatus 663, the FIG. 9 system 771 eliminates the need for an extra drain valve since the inverter apparatus 663 incorporates drain openings 658 and 660 (see FIG. 2) which are effective at idle, and the inverter apparatus provides positive shut-off of flow of fluid at engine off (see FIG. 4).

On acceleration the way in which the exhaust pressure is fed to the top of the tank (through the conduit 656 as illustrated in FIG. 9) provides extra pressurization for increased flow on acceleration, and the way in which the piston 691 positively blocks off flow on deceleration (see FIG. 2) eliminates the need for an accumulator as part of a discriminator combination to accomodate any overrun resulting rom a thermal control valve.

Figure 10:
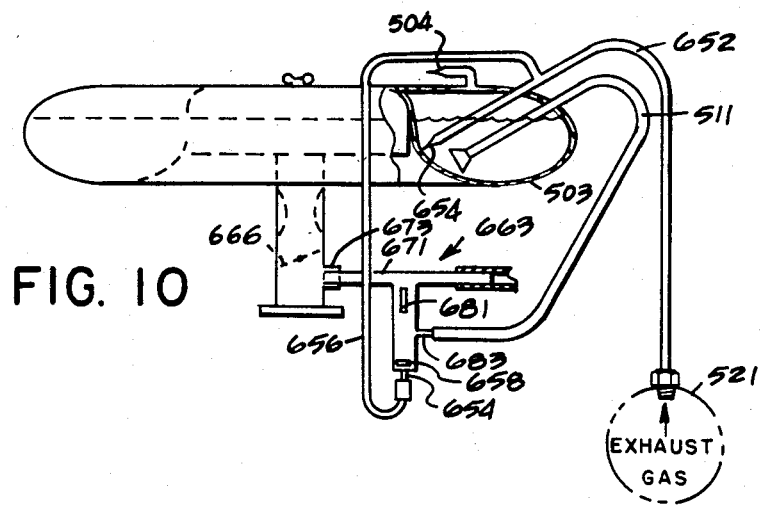
FIG. 10 is a view like FIG. 9 but shows an embodiment of the invention in which the exhaust gas pressure is rectified and supplied to the interior of the water storage tank.

The embodiment shown in FIG. 10 is basically like that illustrated in FIG. 9 (and the like reference numerals have been used to show like parts) with the exception that the exhaust pressurization for the water supply tank 503 is obtained by a direct connection of the conduit 652 to the interior of the tank 503 and a rectifier valve 654 like that shown in FIG. 7 for converting the pulsating, oscillating character of the exhaust gases to a rectified pressure. The rectifier valve 654 also directs the incoming exhaust gases below the surface of the water so that these gases are cleaned. This insures that you have only clean gas coming down through the conduit 656 to the bottom of the inverter apparatus 663.

The rectifier valve 654 eliminates the effects of tuned exhaust systems and the negative pressure result of tuned exhaust systems at the cruising ranges at normal design conditions.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An inverter apparatus for producing an increasing vacuum effect in response to a decreasing vacuum field, said inverter apparatus comprising, cylinder means having an internal cylindrical bore, piston means axially movable within the cylindrical bore, said piston means having a first surface exposed to the vacuum in said vacuum field and having a second surface exposed to atmospheric pressure, spring means for biasing said piston means in a direction opposed to the direction of movement which would be produced by atmospheric pressure on said second surface, a fluid inlet passageway extending through said cylinder means and opening into the cylindrical bore, said piston means having an axially extending side wall facing the cylindrical bore, orifice means formed in said side wall and an outlet passageway located at one end of the orifice means for connecting said end with that portion of the bore having the vacuum acting on said first surface of said piston means, and wherein said axially extending orifice is so located in the side wall of said piston means as to provide a decreasing restriction to flow of fluid from said inlet passageway through the orifice to the outlet with decreasing vacuum.

2. The apparatus of claim 1 wherein said orifice means are movable to a position in respect to said inlet passageway such that the orifice means also provide an increasing restriction to transfer of pressure from the atmospheric pressure acting on said second face of said piston means through said orifice means to said inlet passageway with decreasing vacuum.

3. The apparatus of claim 2 including lean-out air passage means extending through said cylinder means into the cylindrical bore for adding an increased amount of lean-out air to said vacuum field with decreasing vacuum in said vacuum field.

4. The apparatus of claim 2 including pressurizing port means extending through said cylinder means and opening into the cylindrical bore for adding pressurizing gas at super atmospheric pressure to act on said second face of said piston means.

5. The apparatus of claim 4 including a water storage tank for storing water to be converted to steam for feeding through said inlet passageway and including a first exaust gas pressurizing means associated with the tank for supplying exhaust gas pressure to the tank to pressurize the tank to a super atmospheric pressure and including means for conducting said exhaust gas to said pressurizing port means.

6. The apparatus of claim 2 wherein said orifice means are constructed to provide linear pressure proportioning between the atmospheric pressure acting on said second face and the vacuum acting on said first face of said piston means with changing vacuums.

7. The apparatus of claim 6 including land means on said piston means for blocking all flow from said inlet passageway to the orifice means at a certain high level of vacuum.

8. The apparatus of claim 7 including land means on said piston means for blocking all flow out of said inlet passageway on certain low levels of vacuum.

* * * * *